United States Patent
Barat et al.

(10) Patent No.: US 9,832,753 B2
(45) Date of Patent: Nov. 28, 2017

(54) NOTIFICATION HANDLING SYSTEM AND METHOD

(71) Applicant: Google Technology Holdings LLC, Mountain View, CA (US)

(72) Inventors: Nirmalya Barat, Milpitas, CA (US); Francois M. Dermu, San Mateo, CA (US); Parikshit Dharawat, Sunnyvale, CA (US); Su-Yin Gan, Sunnyvale, CA (US); Ansuman Tapan Satpathy, Sunnyvale, CA (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 15/191,335

(22) Filed: Jun. 23, 2016

(65) Prior Publication Data
US 2016/0309445 A1 Oct. 20, 2016

Related U.S. Application Data (63) Continuation of application No. 13/926,046, filed on Jun. 25, 2013, now Pat. No. 9,402,167.
(Continued)

(51) Int. Cl.
*H04L 12/58* (2006.01)
*H04W 68/00* (2009.01)
(Continued)

(52) U.S. Cl.
CPC .... *H04W 68/005* (2013.01); *G06F 15/17312* (2013.01); *H04B 1/385* (2013.01);
(Continued)

(58) Field of Classification Search
CPC ..... H04W 68/00; H04W 68/06; H04W 4/005; H04W 4/12; H04W 4/14; H04W 4/021;
(Continued)

(56) References Cited

U.S. PATENT DOCUMENTS 6,157,945 A  12/2000  Balma et al.
6,337,972 B1  1/2002  Jones et al.
(Continued)

OTHER PUBLICATIONS

"Mount, Power and Play Your iPod in Your Car with the Belkin TuneBase FM for iPod and TuneBase FM for iPod nano," May 8, 2006, Belkin Press Release [online]. First accessed on Sep. 28, 2011. Retrieved from the Internet: http://www.belkin.com/au/press-room/releases/uploads/PR%20TuneBase%20FM.htm. (2 pgs.).
(Continued)

*Primary Examiner* — Nathan Taylor
(74) *Attorney, Agent, or Firm* — Shumaker & Sieffert, P.A.

(57) ABSTRACT

A notification handling system determines a notification type for a notification received at a first device of a group of associated devices. The system determines at least a second device from the group that has a capability related to the notification type and accordingly routes the notification to the second device. The second device may be paired to the first device via a wireless link. The notification handling system also augments the notification with additional information for the second device based on the capability of the second device. The augmented information is obtained by extracting data from the notification and augmenting the notification based on the extracted data. The notification handling system may also send or receive a global notification dismissal that dismisses the notification from all associated devices that may have received the notification.

15 Claims, 9 Drawing Sheets

Related U.S. Application Data (60) Provisional application No. 61/781,295, filed on Mar. 14, 2013.

(51) Int. Cl.
| | |
|---|---|
| *H04W 4/12* | (2009.01) |
| *G06F 15/173* | (2006.01) |
| *H04B 1/3827* | (2015.01) |
| *H04L 29/08* | (2006.01) |
| *H04M 1/725* | (2006.01) |
| *H04W 4/02* | (2009.01) |

(52) U.S. Cl.
CPC ............ *H04L 51/063* (2013.01); *H04L 51/14* (2013.01); *H04L 51/24* (2013.01); *H04L 67/22* (2013.01); *H04M 1/7253* (2013.01); *H04W 4/021* (2013.01); *H04W 4/12* (2013.01); *H04L 51/20* (2013.01); *H04L 51/26* (2013.01)

(58) Field of Classification Search
CPC ...... H04W 68/005; H04B 1/385; H04L 67/22; H04L 51/063; H04L 51/14; H04L 51/20; H04L 51/24; H04L 51/26; H04M 1/7253; G06F 15/17312
USPC ............ 455/412.1, 412.2, 466; 709/206, 209
See application file for complete search history.

(56) References Cited

U.S. PATENT DOCUMENTS

| | | | | |
|---|---|---|---|---|
| 6,601,012 | B1* | 7/2003 | Horvitz ................ | G06Q 10/107 702/150 |
| 6,606,647 | B2 | 8/2003 | Shah et al. | |
| 6,745,025 | B1 | 6/2004 | Chow et al. | |
| 6,871,214 | B2 | 3/2005 | Parsons et al. | |
| 7,016,707 | B2 | 3/2006 | Fujisawa et al. | |
| 7,215,946 | B1 | 5/2007 | Cardina et al. | |
| 7,493,110 | B2 | 2/2009 | Jiang | |
| 8,649,774 | B1 | 2/2014 | Zheng et al. | |
| 8,712,383 | B1* | 4/2014 | Hayes ................ | H04M 19/047 455/404.1 |
| 8,823,507 | B1* | 9/2014 | Touloumtzis ........... | H04L 67/24 340/501 |
| 2003/0020749 | A1 | 1/2003 | Abu-Hakima et al. | |
| 2003/0023690 | A1 | 1/2003 | Lohtia | |
| 2005/0143139 | A1 | 6/2005 | Park et al. | |
| 2005/0180447 | A1* | 8/2005 | Lim ..................... | H04L 12/185 370/432 |
| 2006/0099940 | A1 | 5/2006 | Pfleging et al. | |
| 2006/0133590 | A1 | 6/2006 | Jiang | |
| 2007/0072616 | A1 | 3/2007 | Irani | |
| 2008/0002820 | A1 | 1/2008 | Shtiegman et al. | |
| 2008/0171536 | A1 | 7/2008 | Katz | |
| 2008/0192905 | A1 | 8/2008 | Fujita-Yuhas | |
| 2009/0068993 | A1 | 3/2009 | Allen | |
| 2009/0122786 | A1 | 5/2009 | Lui et al. | |
| 2009/0214014 | A1 | 8/2009 | Cadiz et al. | |
| 2009/0249391 | A1 | 10/2009 | Klein et al. | |
| 2009/0318118 | A1 | 12/2009 | Chang | |
| 2010/0210290 | A1 | 8/2010 | Riley et al. | |
| 2011/0030016 | A1 | 2/2011 | Pino, Jr. et al. | |
| 2011/0138006 | A1 | 6/2011 | Stewart | |
| 2011/0141950 | A1 | 6/2011 | Patil et al. | |
| 2011/0195699 | A1* | 8/2011 | Tadayon .............. | H04B 5/0062 455/418 |
| 2011/0208825 | A1 | 8/2011 | Lee et al. | |
| 2011/0263233 | A1 | 10/2011 | Mikan et al. | |
| 2011/0314064 | A1* | 12/2011 | Jeyaseelan .............. | H04L 51/24 707/803 |
| 2012/0324030 | A1* | 12/2012 | Reed ....................... | G06F 9/542 709/206 |
| 2013/0036187 | A1 | 2/2013 | Messer et al. | |
| 2014/0173026 | A1* | 6/2014 | Buck ....................... | H04L 51/24 709/217 |
| 2014/0181715 | A1* | 6/2014 | Axelrod ................ | G06F 3/0487 715/771 |
| 2014/0273975 | A1 | 9/2014 | Barat et al. | |
| 2014/0280578 | A1 | 9/2014 | Barat et al. | |
| 2015/0213371 | A1* | 7/2015 | Nitz ........................ | H04L 51/02 706/11 |

OTHER PUBLICATIONS

Android, "App Framework," Feb. 18, 2013, http://developer.android.com/about/versions/index.html, 4 pages.

Android, "Manage Notifications," Mar. 12, 2013, http://support.google.com/android/bin/answer.py?hl=en&answer=1638355, 1 page.

Android, "Notifications," Mar. 12, 2013, http://developer.android.com/guide/topics/ui/notifiers/notifications.html, 14 pages.

Android, "Notifications," Mar. 12, 2013, http://developer.android.com/design/patterns/notifications.html, 9 pages.

International Search Report and Written Opinion of international application No. PCT/US2014/017673, dated Aug. 19, 2014, 14 pp.

International Preliminary Report on Patentability from counterpart International Application No. PCT/US2014/017673, dated Sep. 24, 2015, 9 pp.

Prosecution History from U.S. Appl. No. 13/949,729, dated May 5, 2015; 28 pp.

Prosecution History from U.S. Appl. No. 13/926,046, dated Jul. 18, 2014 through Apr. 6, 2016; 84 pp.

* cited by examiner

NOTIFICATION HANDLING SYSTEM AND METHOD

The present application is a continuation of U.S. patent application Ser. No. 13/926,046, filed Jun. 25, 2013, which claimed priority to U.S. Provisional Application No. 61/781,295, filed on Mar. 14, 2013, the contents of each of which are incorporated herein by reference.

FIELD OF THE DISCLOSURE

The present disclosure relates generally to wireless communication systems and mobile devices and more particularly to methods and apparatuses for handling notifications.

BACKGROUND

Notifications provide information to a communication device user that a message has arrived or that some event has occurred, is occurring or is about to occur. For example, notifications may be displayed on a communication device to indicate calendar events, various alarms, waiting messages, etc. Such notifications may be displayed to the user in various ways. For example, some notifications may be displayed as an icon positioned on some section of the communication device display or by displaying a pop-up message that covers a portion of the display screen and that must be closed by the user by taking some specific action. Notification messages may be generated by various applications resident on a communication device, or may be sent by a network or from the communication device operating system.

Many users employ multiple communication devices; however a user typically can only use a single device at any one period of time. A notification message received on a particular device may not be particularly useful in that the particular device may not have capability to respond to the notification and a useful way.

DETAILED DESCRIPTION

The disclosed embodiments provide a notification handling system and various methods of operations. One method of operation of the notification handling system determines a notification type, for a notification received at a first device of a group of associated devices, and determines at least a second device that is capable of responding to the notification. The notification handling system then routes the notification to the second device. The notification handling system may also augment the notification with additional information for the second device based on the capability of the second device.

The augmented information is obtained by extracting data from the notification and augmenting the notification based on the extracted data. The notification handling system may also send or receive a global notification dismissal that dismisses the notification from all associated devices that may have received the notification.

The notification handling system parses the received notification and extracts data such as time sent, related content that is related to the notification, identity of a sender or identity of an application that generated the notification. The notification handling system then augments the notification using at least a portion of the extracted data as additional information.

In some embodiments, the notification handling system obtains sensor data from a set of sensors of the second device, and analyzes the sensor data to determine the environment in which the second device is present. The notification handling system then routes the notification to the second device if the determined environment is suitable for the user to receive the notification. For example, if the notification type is related to audio data, that notification may not be routed to a device if the device is found to be in a high noise level environment. The sensor data could be an accelerometer, a gyroscope, a light level sensor, a temperature sensor, or an audio sensor or some other type of sensor. Other types of environments may include being in motion due to the user running or walking, being in motion in a vehicle, being in motion on a train, or being in a high-noise level environment, etc.

The notification handling system may also obtain location information from the second device, and may determine whether the second device is in the proximity to the first device prior to routing the notification to the second device. The notification may be routed according to a notification priority and a determined response action based on the related content of the notification.

In another method of operation of a notification handling system, the system may receive a notification at a first device of a group of associated devices, route the notification from the first device to each device of the group of associated devices, receive a notification dismissal from one device of the group of associated devices in response to the one device having received the notification, and route the notification dismissal to the first device and each other device of the group of associated devices.

The notification may be dismissed on the first device, and each device of the group of devices, in response to the notification dismissal received by the first device and by each device of the group of associated devices. In other words, the dismissal from one device is a global notification dismissal that dismisses the like notification from any devices in a group of devices that received the particular notification.

The present disclosure also provides a device the has at least one wireless transceiver, a memory, and a notification handling system, operatively coupled to the at least one transceiver and to the memory. The notification handling system is operative to perform the methods of operations described herein.

A disclosed system includes a communication device and a wearable device such as a wristwatch. The wearable device can receive the notification over a wireless link with the communication device and can send a global notification dismissal to the communication device using the wireless link. The global notification dismissal dismisses the notification from the communication device and any other device of a group of associated devices that received the notification.

One disclosed embodiments includes a device that has at least one programmable processor and memory operatively coupled to the programmable processor. The memory contains executable instructions for execution by the programmable processor, where upon executing the executable instructions the programmable processor is operative to provide a notification handling system in an application framework layer of a software stack. The notification handling system is operatively coupled to a notification manager of the application framework layer, and to various applications in an application layer of the software stack.

The notification handling system operative to intercept received notifications obtained by the plurality of applications by communicating with the various applications through the notification manager. The notification handling system may parse the received notifications to determine notification content, origin and priority, and generate new notifications containing augmented information related to the received notifications. The notification handling system selects one or more associated devices capable of receiving and responding to the new notifications, and routes the new notifications to the one or more associated devices using a network.

The notification handling system may select one or more associated devices capable of receiving and responding to the new notifications by assessing user behavior based on a user history. The user behavior provides information about how a user has responded to notifications of a given type and having a given notification content, origin and priority in the past. The notification handling system selects one or more associated devices capable of enabling the user to respond to the new notifications accordingly to past assessed user behavior.

The notification handling system may also assess a device environment for each of the one or more associated devices based on sensor data obtained from each of the one or more associated devices, and by using device environment along with the user behavior to determine when to send the new notifications.

Figure 1:
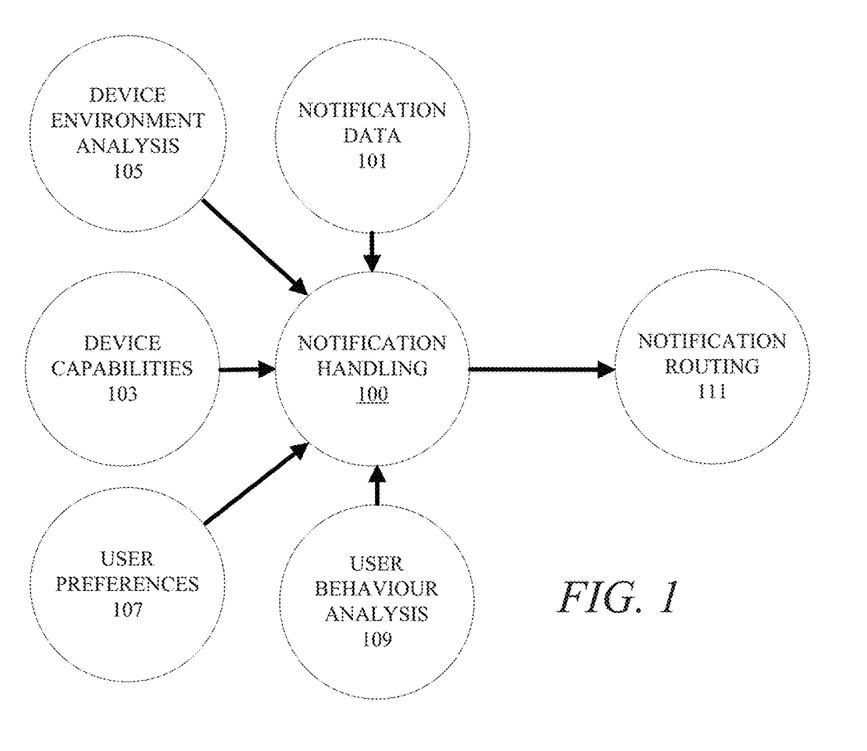
FIG. 1 is a diagram of inputs and output for a notification handling system in accordance with an embodiment.

Turning now to the drawings, FIG. 1 illustrates an example of the inputs and output for a notification handling system 100 in accordance with an embodiment. A notification handling system 100 receives various inputs from each communication device of a group of communication devices including notification data 101, device capabilities 103, device environment analysis 105, user preferences 107 and user behavior analysis 109. Based on one or more of these various inputs, the notification handling system 100 makes decisions and may create an augmented notification useful for a particular communication device or for a group of communication devices that may have limited capabilities for responding to the notification. The notification handling system 100 appropriately sends the augmented message to one or more communication device using a notification routing module 111.

Figure 2:
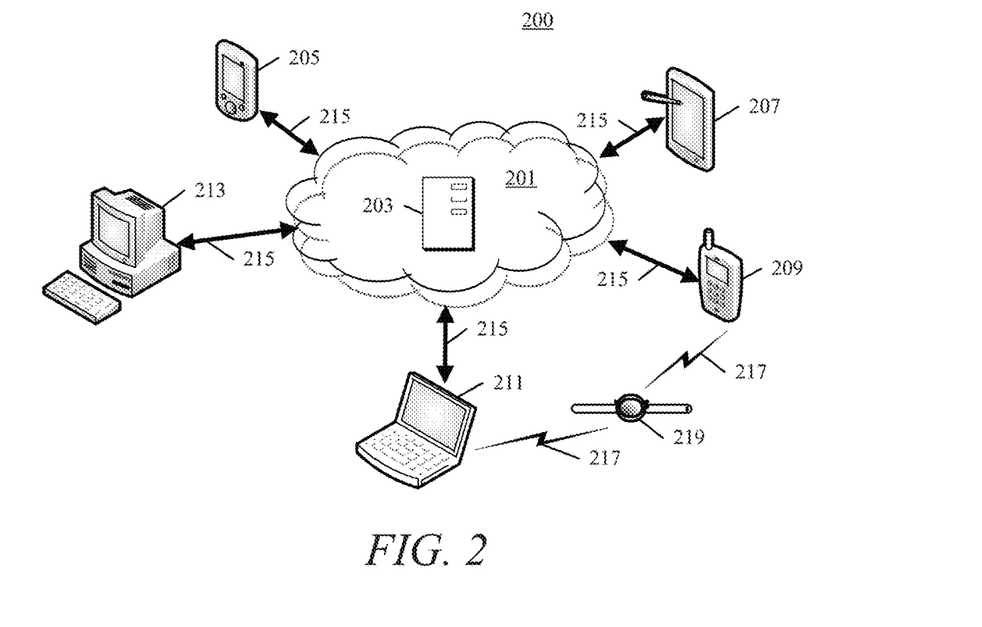
FIG. 2 is block diagram of plurality of user devices in communication with each other and with a network server in accordance with the embodiments.

FIG. 2 is diagram of group of user communication devices 200 in communication with each other and with a network server 203 in accordance with the embodiments. A single user may own and employ the group of communication devices 200 which may include, but is not limited to, personal computer 213, personal digital assistant (PDA) 205, a tablet or e-book reader 207, a mobile telephone 209, a laptop computer 211 and a smart watch 219. Each one of these devices is referred to herein as a communication device and has a corresponding network connection 215 to a network 201 which may be, for example, the Internet. A server 203 may be a cloud-based server and resides within the network 201. The server 203 includes a notification routing and push mechanism and is operative to communicate with any of the group of communication devices 200 over the corresponding appropriate network connection 215.

The smart watch 219 may communicate with one or more of the other communication devices, such as the mobile telephone 209 or the laptop computer 211, using a wireless link technology that facilitates the wireless link 217 between the smart watch and the respective communication devices as shown. Any one communication device of the group of communication devices 200 may receive notifications from the network 201 or may generate notifications based on applications or operating systems operating on the respective communication device.

Figure 3:
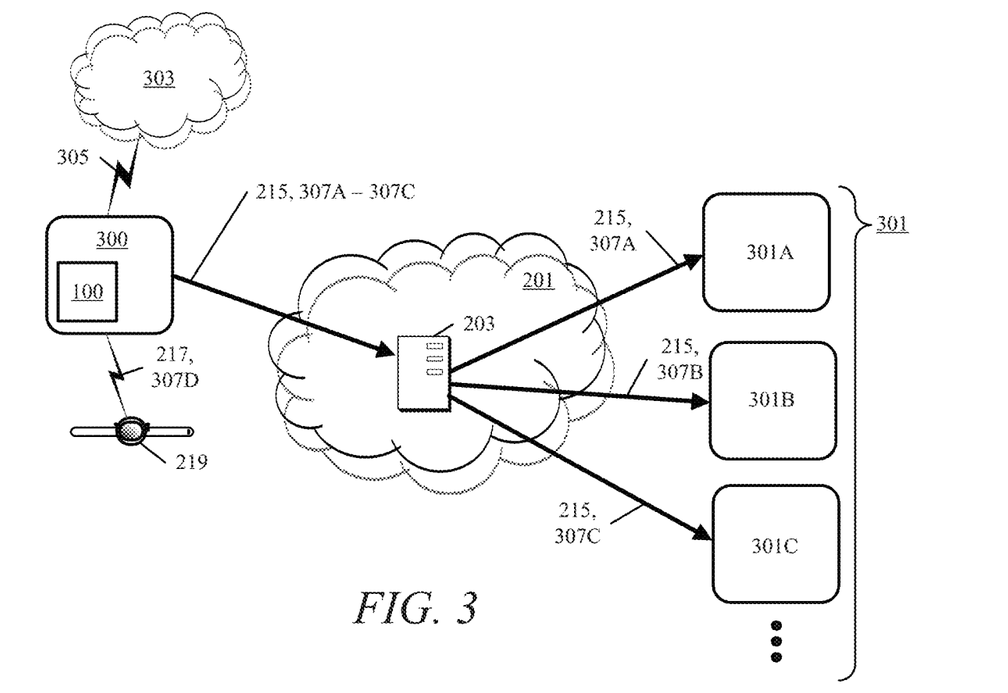
FIG. 3 is diagram showing communication of notifications between various mobile devices and a server in accordance with the embodiments.

FIG. 3 is diagram showing communication of notifications between various communication devices 301 and 300 and the server 203 in accordance with the embodiments. Communication device 300 can be any communication device of the group of communication devices 200 shown in FIG. 2. In accordance with embodiments, the communication device 300 includes the notification handling system 100 discussed briefly with respect to FIG. 1. The communication device 300 may communicate with a wide area network (WAN) 303 over wireless link 305. For example, if communication device 300 is a mobile telephone, the WAN 303 may be a wireless telephone network. The communication device 300 is operative to communicate with the server 203 residing in the network 201. Communication between the communication device 300 and network 201 may be facilitated by the WAN 303 in some embodiments; however the communication device 300 may have other wireless transceivers to communicate with other networks other than WAN 303 to achieve connectivity with the network 201.

In one example illustrated by FIG. 3, the communication device 300 may receive a notification from the WAN 303 over the wireless link 305. In accordance with one embodiment, the communication device 300 may route the notification to one or more communication devices of a group of communication devices 301. In the example shown in FIG. 3, the group of other communication devices 301 includes communication device 301A, 301B and 301C and possibly other communication devices not shown. Each communication device of the group of communication devices 301 is operative to communicate with server 203 using the network 201. The communication device 300 forms connection 215 to the server 203 by, for example, logging into the server 203. The user of the communication device 300 will also be the user of the group of communication devices 301, and each device will be associated with the user's account with server 203. The user will also have associated the communication device 300 and each one of the group of communication devices 301 with the user's account. In one example, the user may associate each of the communication devices with the user's account login ID.

The notification handling system 100, which is present on at least communication device 300, may automatically establish the connection 215 between the communication device 300 and server 203 without any intervention from the user. Likewise, each one of the communication devices of the group of communication devices 301 may receive information, or send information, over a connection 215 to the server 203. Returning to the example under discussion, the communication device 300 may receive a notification from the WAN 303 over the wireless link 305, or alternatively a notification may be generated by an application resident on the communication device 300. The notification handling system 100 will analyze the notification and take appropriate action. For example, the notification handling system 100 may create an augmented notification that has information additional to the initial notification displayed and communication device 300. The notification handling system 100 may send the augmented notification to the entire group of communication devices 301 or to a specific communication device. In the example illustrated in FIG. 3, augmented notifications 307A through 307C are sent to the respective communication devices by utilizing a routing push mechanism of the server 203. The server 203 receives the augmented notifications 307A, 307B and 307C, and appropriately pushes them to the corresponding communication device. Therefore, augmented notification 307A is sent to communication device 301A, augmented notification 307B is sent to communication device 301B, augmented notification 307C is sent to communication device 301C and so forth. The smart watch 219 may also receive an augmented notification 307D over the wireless link 217 between the smart watch 219 and the communication device 300.

Therefore, in one example illustrated in FIG. 3, a notification received by communication device 300 is handled by the notification handling system 100 and is augmented for each communication device associated with the user communication device 300, and is routed to that specific communication device using a routing push mechanism of the server 203 or some other appropriate routing mechanism.

Figure 4:
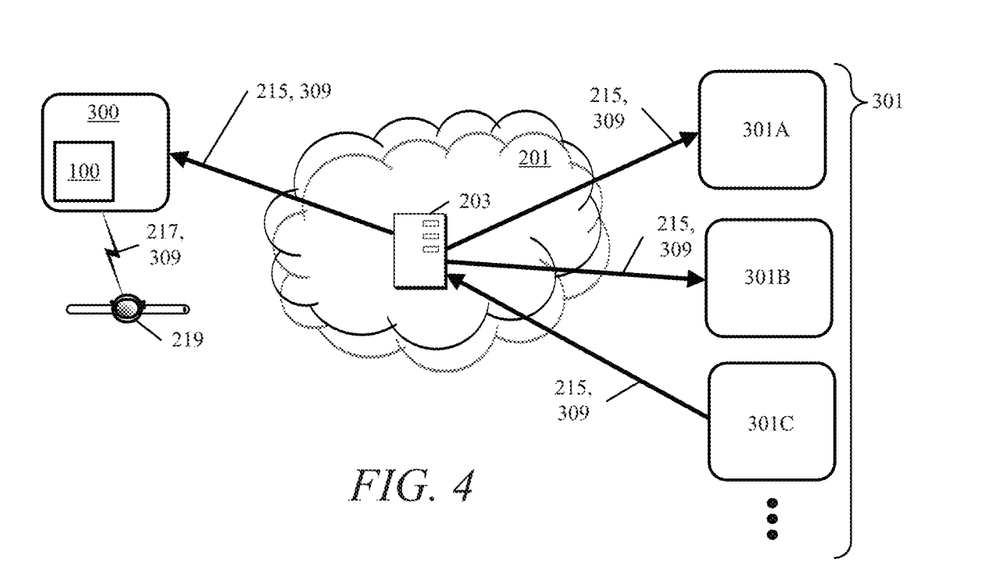
FIG. 4 is a modified version of the FIG. 3 diagram showing one example use case of communication of notifications between various mobile devices and a server in accordance with the embodiments.

FIG. 4 modifies the FIG. 3 diagram to show one example use case of routing of notifications and responses between the various communication devices and the server 203 in accordance with the embodiments. In the example of FIG. 4, the communication device 301C responds to the augmented notification received in the example of FIG. 3. The notification response 309 is sent by communication device 301C to the server 203 which is then routed to each of the other communication devices including communication device 301A, communication device 301B and communication device 300. The communication device 300 subsequently routes the response 309 to the smart watch 219 over the wireless link 217.

In some embodiments, the notification response 309 may be a dismissal of the notification. Furthermore, the notification response 309 may be a global dismissal in that it appropriately dismisses the notification from being displayed on each of the communication devices to which the notification response 309 is sent. That is, the notification response 309 may be considered a control or command signal that controls or commands the receiving communication devices to dismiss the notification from the respective communication device display.

Figure 5:
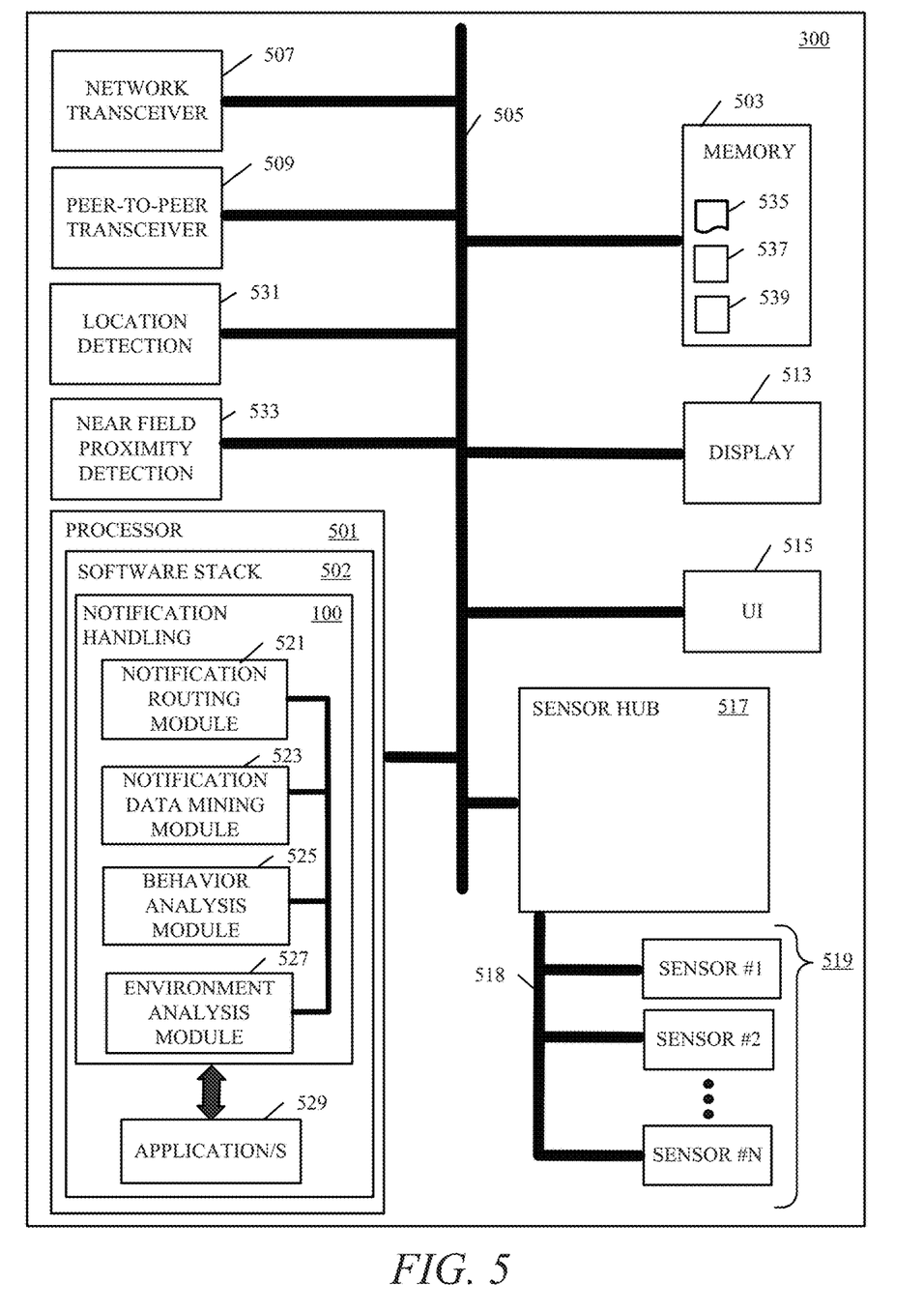
FIG. 5 is a partial schematic block diagram of a mobile device in accordance with an embodiment.

Further details of the notification handling system 100 are illustrated in FIG. 5 which is a partial schematic block diagram of the communication device 300. The notification handling system 100 may consist of several components including notification routing module 521, notification data mining module 523, behavior analysis module 525, and environment analysis module 527. Each of these modules are operatively coupled to one another and are operative to send information including command and control signals from one module to another. The various methods of operation of the notification handling system 100 and its various components are best understood with respect to the flowcharts and various other diagrams provided herein which are described in detail below.

The partial schematic block diagram of a communication device 300 provides an example of one kind of apparatus in accordance with the embodiments. The FIG. 5 diagram is for the purpose of describing to those of ordinary skill how to make and use the disclosed subject matter by way of an example embodiment. It is to be understood that FIG. 5 is a partial schematic block diagrams in that, although the diagram shows at least those components necessary to describe the features and advantages of the various embodiments to those of ordinary skill, various other components, circuitry, and devices may be necessary in order to implement a complete functional apparatus such as the example communication device 300 and that those various other components, circuitry, devices, etc., are understood to be present in the embodiments by those of ordinary skill.

Likewise it is to be understood that FIG. 5 illustrates examples of components that may be present in the communication device 300 and that one or more of the various components shown in FIG. 5, other than the notification handling module 100, may be omitted from the mobile device 300 without detracting from enjoyment of the benefits, features and advantages of the present disclosure. That is, different communication devices may or may not include some of the example components shown in FIG. 5 and therefore none of these example components are to be construed as being required for any particular embodiment.

The notification handling system 100 or any of its components (i.e. "modules") shown in FIG. 5 may be implemented independently as software and/or firmware executing on one or more programmable processors, and may also include, or may be implemented independently, using ASICs, DSPs, hardwired circuitry (logic circuitry), or combinations thereof. That is, the notification handling module 100 may be implemented using an ASIC, DSP, executable code executing on a processor, logic circuitry, or combinations thereof.

The various sensors 519 may require hardwired circuitry and any such, or other, required hardwired circuitry in the communication device 300 may include any of various components such as, but not limited to, oscillators, comparators, clocking circuits, operational amplifiers, other active components such as transistors, and passive components, etc., all of which are understood to be present in the embodiments by those of ordinary skill as necessary for implementing the mobile device 300.

An internal connection bus 505 provides operative coupling between the various communication device 300 components. That is, between any two or more operatively coupled components, there may be one or more intermediate or intervening components between, or along the connection path. Such components are understood herein to be operatively coupled.

Operative coupling may also exist between modules or components implemented as software or firmware executing on a processor and such "software coupling" may be implemented using libraries or application programming interfaces (APIs) or other software interfacing techniques as appropriate.

The display 513, if present, may provide a touchscreen user interface and, in some embodiments, may also provide a graphical user interface (GUI). The network transceiver 507, if present, may provide wireless communication capabilities for one or more wide area network communications systems such as, but not limited to, Wi-Fi cellular, 2G, 3G or 4G wireless communications systems. The peer-to-peer transceiver 509, if present, may provide wireless connectivity capabilities such as, but not limited to, Bluetooth™, Wireless USB, ZigBee, or other technologies, etc. such as near field communication (NFC). The user interfaces (UI) 515 may include a track ball mouse, touch sensitive elements, physical switches, gyroscopic position sensors, etc. The display 513, if present, may include touchscreen functionality as noted above, and may be operative to receive command and control signals from the UI 515 directly, or via the processor 501, for functions such as, but not limited to, mouse cursor control click to provide selection input and or drag and drop features or other functionality in some embodiments.

The memory 503 is a non-volatile, non-transitory memory, and stores the executable code 539 corresponding to the notification handling module 100 including any components such as notification routing module 521, notification data mining module 523, behavior analysis module 525 or environment analysis module 527. The processor 501 is operative to execute the executable code 539, which may be stored in memory 503, to perform the methods of operation disclosed herein. The memory 503 may also store a user history 535 which is accessed and used by the behavior analysis module 525. User settings 537 may also be stored in memory 503 and may be accessed by the notification handling system 100 or any of its component modules to determine how to handle and route notifications in accordance with user preferences.

The various embodiments also include non-volatile, non-transitory computer readable memory, other than memory 503, that may contain executable instructions or executable code, for execution by at least one processor, that when executed, cause the at least one processor to operate in accordance with the functionality and methods of operation herein described. The computer readable memory may be any suitable non-volatile, non-transitory, memory such as, but not limited to, programmable chips such as EEPROMS, flash ROM (thumb drives), compact discs (CDs) digital video disks (DVDs), etc., that may be used to load executable instructions or program code to other processing devices such as communication devices or other devices such as those that may benefit from the features of the herein described embodiments.

Figure 6:
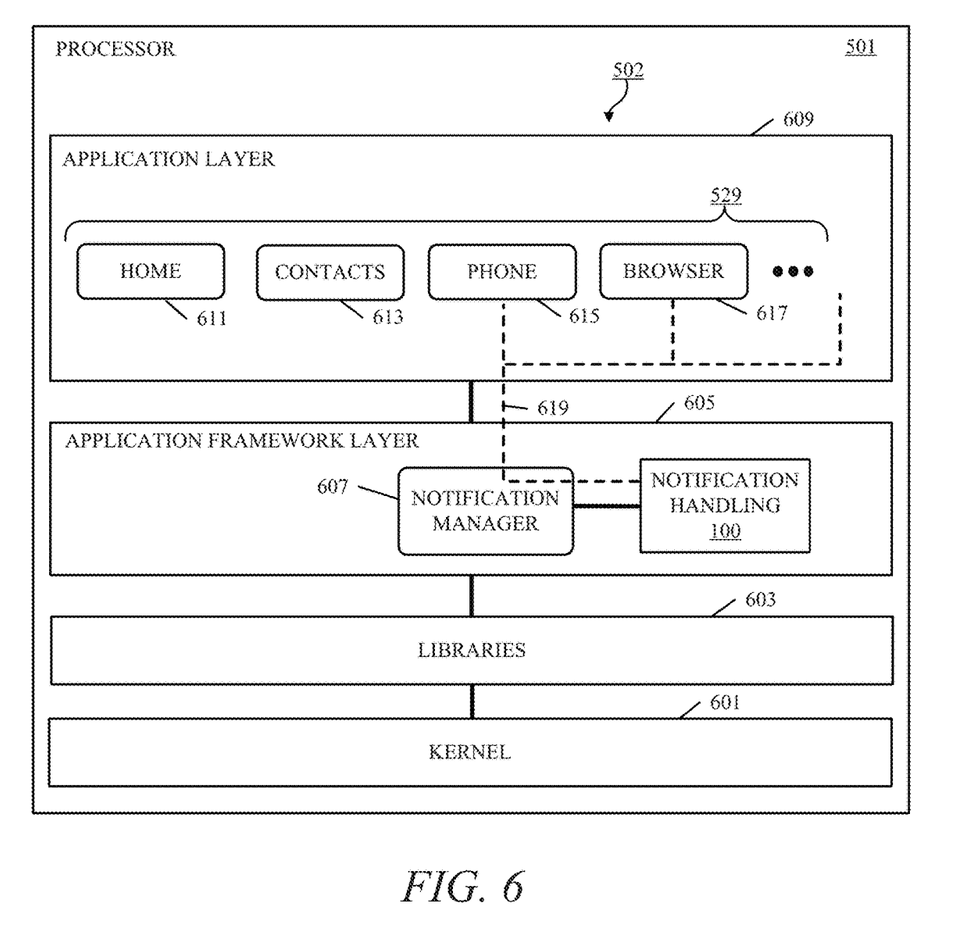
FIG. 6 is a diagram of a software stack executing on a processor in accordance an embodiment.

FIG. 6 is a diagram showing further details of the software stack 502 executing on processor 501 in accordance with an embodiment. The notification handling system 100 may reside within an application framework layer 605 and is operatively coupled to a notification manager 607. The operative coupling may be achieved by software coupling that allows information flow and command and control signals between the notification handling system 100 and the notification manager 607 which further interacts with applications 529 executed within an application layer 609. The software coupling between the notification handling system 100 and the notification manager 607 may, in some embodiments, utilize libraries or APIs contained within the libraries 603 layer of software stack 502. The software stack 502 also includes kernel 601 which provides interfaces between the operating system functionality and lower-level systems such as device drivers and other hardware access etc. as understood by those of ordinary skill.

That is, the kernel 601 provides fundamental interaction at the hardware level of communication device 300. For example, the kernel 601 may provide required operating system tasks such as program loading, system resource allocation, handling device input and output, and some memory management functions. The kernel 601 may be created as an object-oriented design that can interface, and enable communication with, programming objects within the software stack 502 and an operating system overall used by communication device 300.

The applications 529 residing within the application layer 609 may include a home screen 611, contact lists 613, a mobile phone application 615, a browser 617 and various other applications not shown. The notification handling system 100 is operatively coupled to at least the mobile phone application 615, and possibly also the browser 617, by operative coupling 619 through the notification manager 607. The operative coupling is software coupling utilizing any necessary library or API from the libraries 603 layer.

That is, notifications meant for the mobile phone application 615 or the browser 617, or any other operatively coupled application of applications 529, may be intercepted by the notification handling system 100 and parsed, analyzed, and augmented in order to achieve the features and functions of the embodiments herein described. Likewise the notification handling system 100 may send command or control signals to perform various functions related to the notifications of the applications such as, but not limited to, dismissing the notifications from display on the particular communication device, or responding to the notifications in any of various ways.

Figure 7:
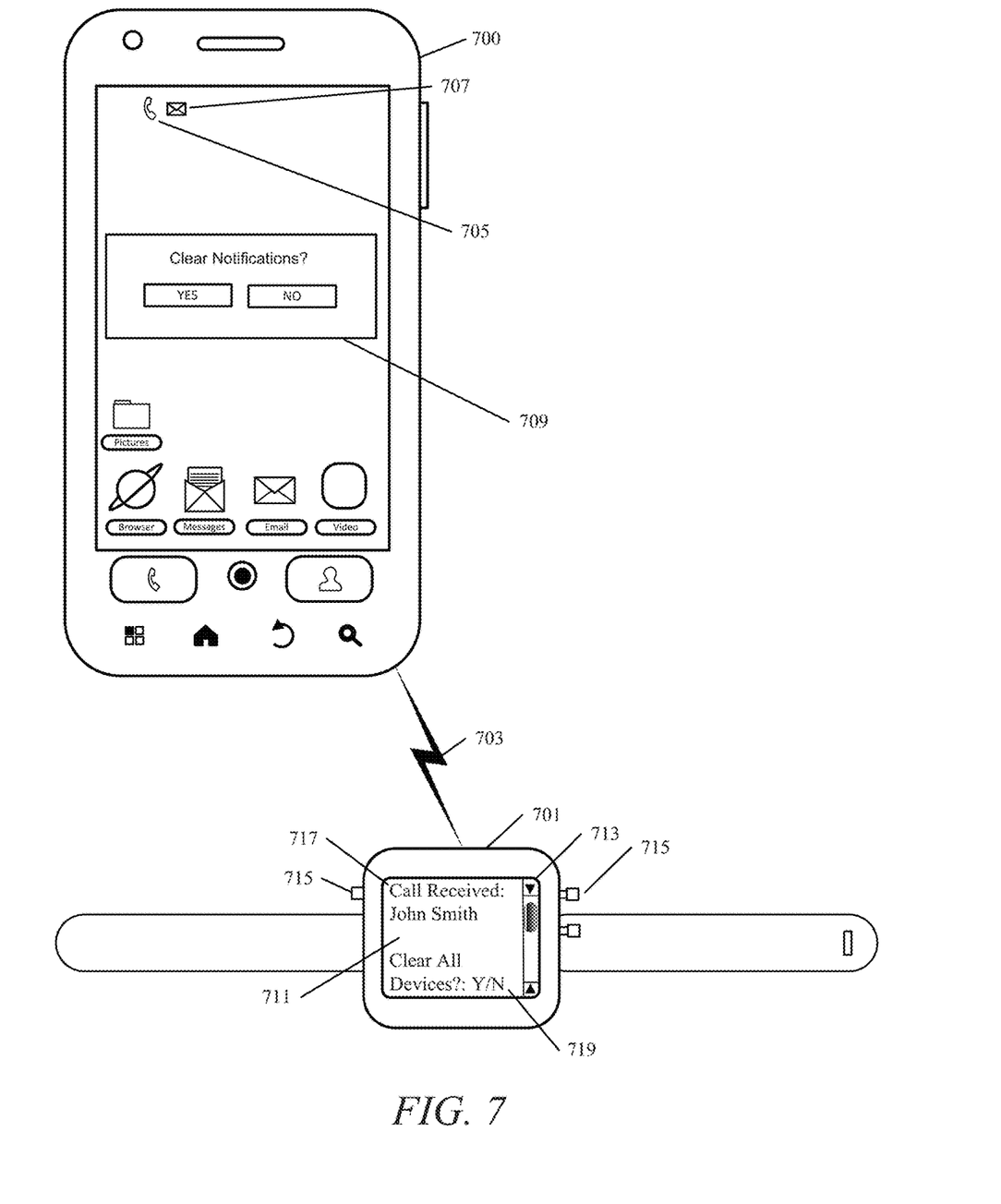
FIG. 7 is a diagram illustrating an example communication between a wearable device and a mobile device in accordance with an embodiment.

FIG. 7 is a diagram illustrating an example of communication between a wearable device, i.e. smart watch 701, and a mobile device, i.e. communication device 700, in accordance with an embodiment. In FIG. 7, the communication device 700 is a mobile telephone which receives a notification. In one example, the notification may be related to an incoming call. The communication device 700 may forward this notification to a paired device, such as the smart watch 701, over the wireless link 703. The smart watch 701 includes a display 711 and user interfaces such as a scrollbar 713 on a graphical user interface and various buttons 715. Smart watch 701 may display a notification 717 on the display 711 such as the message "Call received: John Smith". The notification 717 may be an augmented notification in that the communication device 700, upon receiving the incoming call, would only display the "call received" indicator icon 705 but would not display any information regarding the identity of the caller. Likewise, the communication device 700 may display the "e-mail received" indicator icon 707 which also provides little information other than the information that a message has been received. Therefore, a notification handling system in accordance with the embodiments residing in communication device 700 may augment the notification 705 and send the augmented notification to the smart phone 701 over the wireless link 703. Therefore the notification 717 displayed on the smart watch 701 display 711, is an example of an augmented notification.

Another notification 709 (or an input query) may be displayed by communication device 700 that enables the user to perform a global dismissal of the notification and clear all devices of the notification. The notification 709 may also be forwarded to the smart watch 701 and displayed as notification 719. By pressing one of the buttons 715 for example, the user may clear the prior notification 717. In the example of FIG. 7, if the user pressed the appropriate one of the buttons 715, the smart watch 701 would send a global dismissal command signal to the communication device 700 over the wireless link 703. The communication device 700 would then route the global dismissal through the appropriate server to any other communication devices associated with that user so that the notification would be appropriately dismissed from each communication device.

Alternatively the user may use the respond to notification 709 using the communication device 700 and clear the notifications from the communication device 700 which would likewise send a global dismissal signal to all other associated communication devices including the smart watch 701.

In another example the user may take some action other than dismissal such as responding to a notification on an appropriate device. For example, if the notification is related to a received text message, the user may wish to respond by sending a like text message in reply to the text message sender. However the smart watch 701 may be incapable of sending a responding text message due to its lack of a keypad. In this case, the notification handling system would determine which device or devices to route the notification to, based on the known capability of each device. That is, the smart watch 701 would not receive the notification in some instances when the smart watch 701 was not the appropriate device to respond to the notification.

In accordance with the embodiments, other criteria may also be used for deciding when to send given notifications to particular devices based on the environment of the particular device and other factors as will be described in further detail below.

Figure 8:
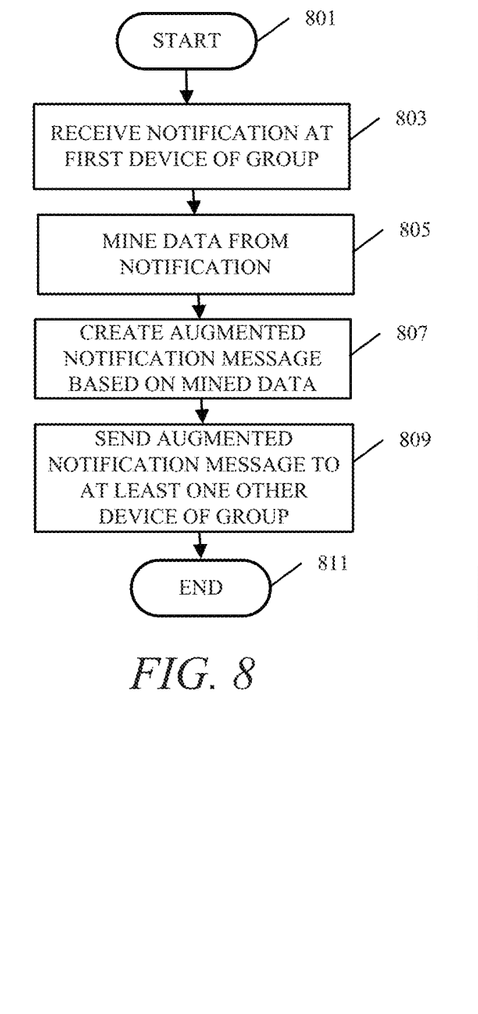
FIG. 8 is a flow chart showing operation of a notification handling system in accordance with various embodiments.

FIG. 8 is a flow chart showing a method of operation of a notification handling system in accordance with various embodiments. The method of operation begins in block 801 as shown and a notification is received by a first device of a group of devices as shown in block 803. In block 805, a notification handling system, resident on the first device, mines data from the notification. In block 807, the notification handling system creates an augmented notification message based on the mined data and sends the augmented notification message to at least one other device of the group as shown in block 809. The method of operation ends in block 811.

Figure 9:
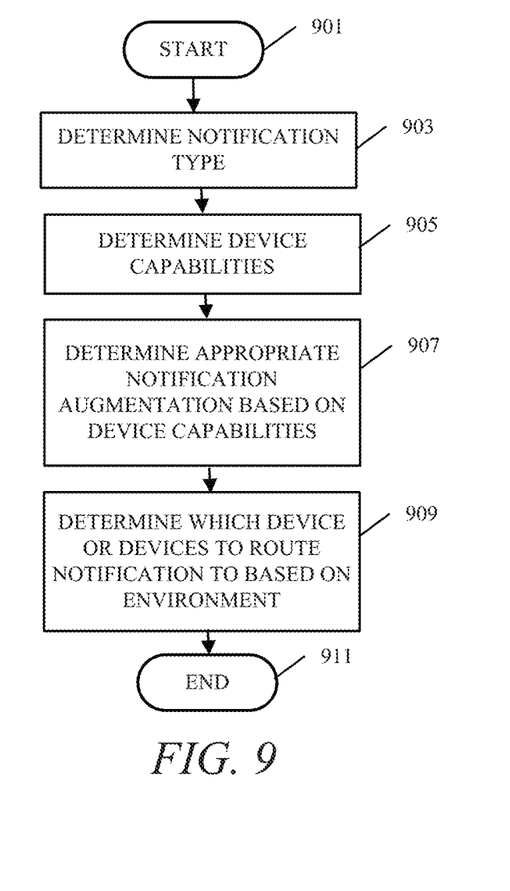
FIG. 9 is a flow chart showing operation of a notification handling system in accordance with various embodiments.

FIG. 9 is a flow chart showing a method of operation of a notification handling system in accordance with various embodiments. The method of operation begins in block 901 and the notification handling system determines the notification type for the received notification in block 903. The notification handling system determines the device capabilities for every other device in the group of devices as shown in block 905. The device capabilities may be determined when each device is initially associated with the user's login ID. The capability information may be stored in the server 203 and pushed to each of the communication devices in the group. In this way, the notification handling system on a communication device is aware of the capabilities of each other communication device owned or used by the user. In block 907, the notification handling system determines the appropriate notification augmentation for each device based on the device's capabilities. In block 909 the notification handling system determines which device or devices to route the notification to based on the environment sensed and analyzed for the particular device. The method of operation ends in block 911 as shown.

Figure 10:
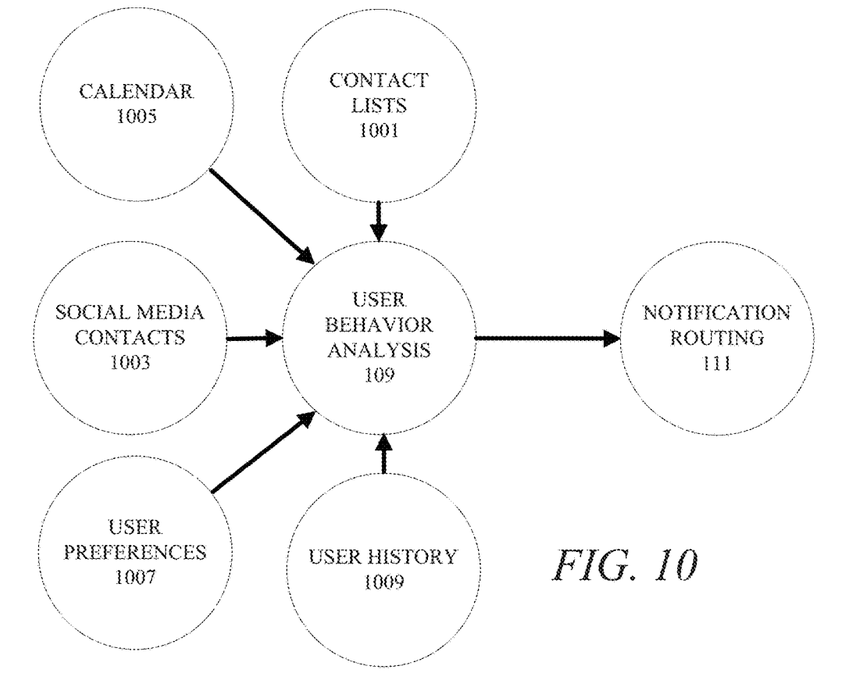
FIG. 10 is a diagram of inputs and output for user behavior analysis in accordance with an embodiment.

FIG. 10 is a diagram of inputs and output for the user behavior analysis in accordance with an embodiment. The user behavior analysis module 109 obtains information from contact lists 1001, at least one calendar application 1005, various social media contacts 1003, user preferences 1007, and a user history 1009. The user history 1009 informs the user behavior analysis module 109 of past interactions with various notification types, contacts in contact lists 1001 or social media contacts 1003, certain events, etc., such that the user behavior analysis module 109 can create and follow a user specific protocol for handling specific notifications. The user behavior analysis module 109 then provides the user behavior analysis information to the notification routing module 111 for appropriate routing. For example, a given type of notification may be historically responded to by sending a text message. The notification routing 111 may then accordingly, provided other criteria are satisfied, route the notification to a communication device that has a keypad so that a text message reply can be sent by the user.

Figure 11:
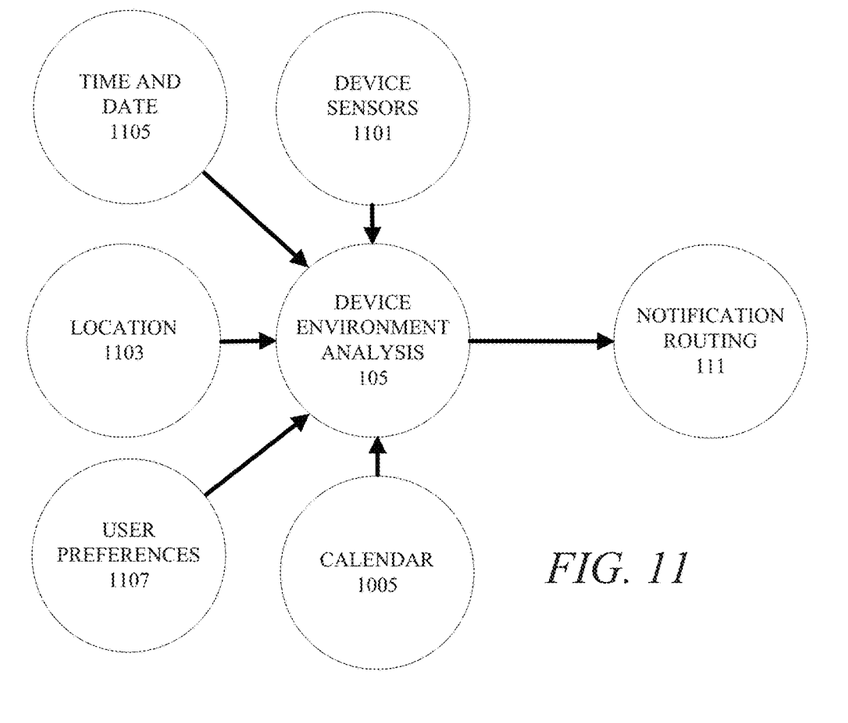
FIG. 11 is a diagram of inputs and output for device environment analysis in accordance with an embodiment.

FIG. 11 is a diagram of inputs and output for device environment analysis in accordance with an embodiment. The device environment analysis module 105 receives inputs from device sensors 1101, the time and date 1105 of the particular notification, the location 1103 of the particular communication device, any user preferences 1107, and other information such as what may be contained in calendar 1005. For example, the user may have an appointment in the calendar 1005 that indicates that the user will be in a certain environment such as traveling in a car, on a train or in an airplane such that sending a notification to a particular device with the user at that particular place and event would not be useful. The device environment analysis module 105 then sends its analysis as information to the notification routing module 111 for taking appropriate action.

Figure 12:
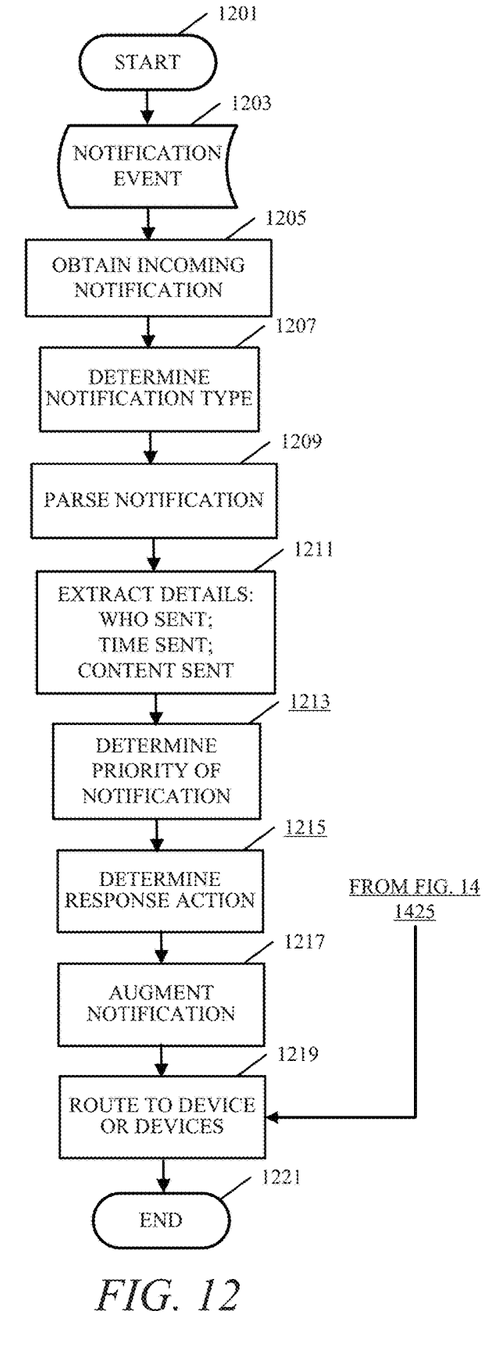
FIG. 12 is a flow chart showing operation of a notification handling system in accordance with various embodiments.

FIG. 12 is a flow chart showing further details of operation of a notification handling system in accordance with various embodiments. The method of operation begins in block 1201 as shown and the notification event is received in block 1203. The notification handling system obtains the incoming notification in block 1205 and determines the notification type in block 1207. This may include parsing the notification as shown in block 1209, and extracting details from the notification as shown in block 1211. The details extracted may include the identity of the person or application that sent or generated the notification, the time the notification was sent, and may summarize any particular content contained within the notification or that the notification is related to. For example, if the notification is related to an incoming text message or e-mail message, the notification handling system may perform some analysis of the content in order to provide a summary in the augmented notification. In block 1213 the notification handling system determines the priority of the notification and further details of this operation is illustrated in FIG. 13.

Figure 13:
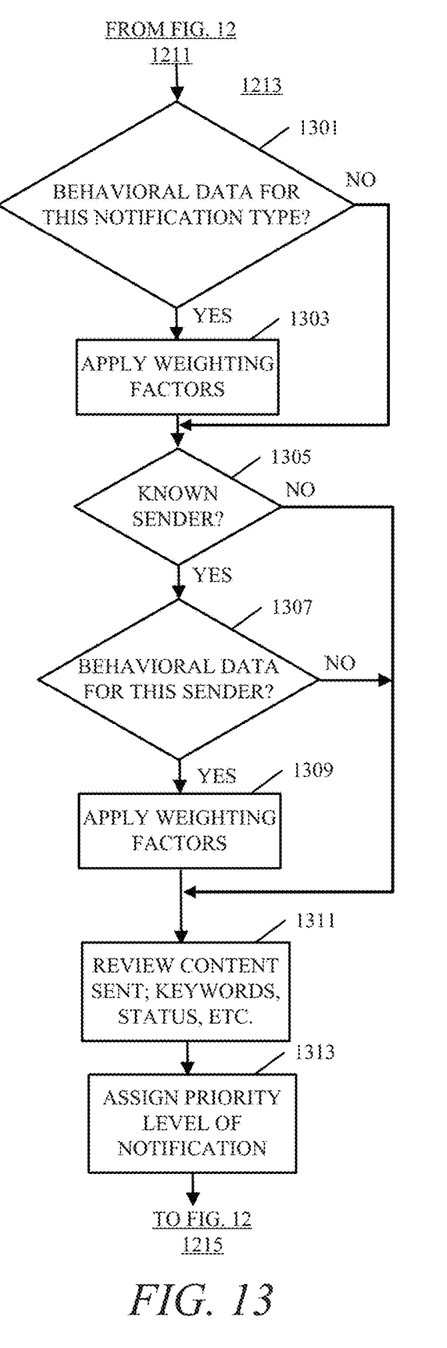
FIG. 13 is a flow chart showing further details of operation related to the flow chart of FIG. 12.

Turning to FIG. 13, in decision block 1301 the notification handling system determines if any behavioral data exists for the particular notification type received. If yes, then the notification handling system may apply weighting factors based on the behavioral data as shown in block 1303. If no behavioral data is found to exist in decision block 1301, then the method of operation proceeds to decision block 1305 and determines whether the sender of the notification is known entity or not. The entity may be a person when the notification is related to a telephone call, text message, an e-mail message etc., or may be a specific application such as a calendar application informing the user of an upcoming appointment. If the sender is not identifiable in decision block 1305, then the method of operation proceeds to block 1311. However if the sender of the notification is identified in decision block 1301, then the notification handling system checks to see if any behavioral data exists related to the particular sender as shown in decision block 1307. If not, the method of operation again proceeds to block 1311. If behavioral data does exist then weighting factors are applied as shown in block 1309.

Proceeding with the operation related to block 1311, the notification handling system reviews any content including searching for keywords, message status, or other information. Then, as shown in block 1313, the notification handling system assigns a priority level for the notification. The assigned priority level may be different than the priority level the notification inherently had assigned and which may have been assigned by an application or by a person sending a message related to the notification. Put another way, a notification may be re-prioritized by the notification handling system.

Figure 14:
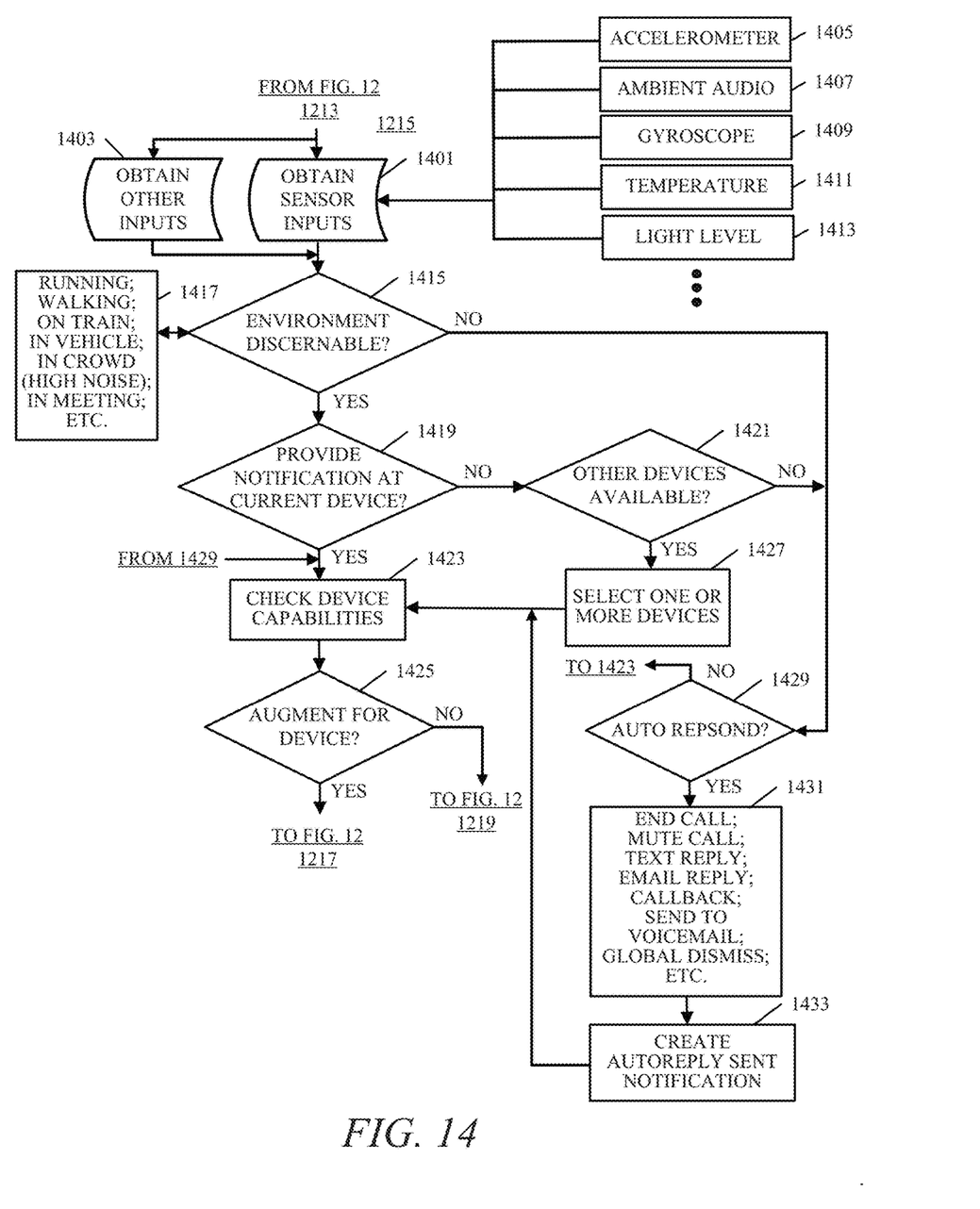
FIG. 14 is a flow chart showing further details of operation related to the flow chart of FIG. 12.

The method of operation then returns to block 1215 and the process flow shown in FIG. 12 continues. In block 1215, the notification handling systems determines the appropriate response action. Further details of operation related to the operations of block 1215 are shown in FIG. 14. Thus the method of operation proceeds to input blocks 1401 and 1403. At input block 1401, the notification handling system obtains sensor inputs from a set of sensors operative in one or more of the communication devices that are candidates for receiving and augmented notification. The sensors may include, but are not limited to, accelerometer 1405, an ambient audio sensor 1407, a gyroscopic sensor 1409, a temperature sensor 1411, or light level sensor 1413, etc. The notification handling system may also obtain other inputs as shown in input block 1403 such as some of the inputs that were discussed with respect to the various component modules in FIG. 1, FIG. 10 or FIG. 11.

Based on the sensor data or other data received, the notification handling system determines if the environment is discernible as shown in decision block 1415. For example, the notification handling system may determine one of the environments 1417 such as that the user is running, walking, on a train, in a vehicle, in a crowd or other high noise environment, in a meeting, etc. For example, ambient audio information may be an indicator that the user is in a high noise environment while calendar information obtained as other inputs at input block 1403 may indicate that the user is at an outdoor concert. In that case, sending a certain type of notification to the user's mobile telephone at the concert would not be useful. Thus, if the environment is discernible in decision block 1415, then the notification handling system will decide whether to provide the notification at the current device only as shown in decision block 1419, that is, to display the notification and not route the notification any further. If yes and the notification should remain at the local device, then the notification handling system may check for device capabilities as shown in block 1423 and may further decide whether to augment the notification for the particular device as shown in decision block 1425.

If the notification handling system decides that the notification should be routed to another device in decision block 1419, then the notification handling system may check with the appropriate server to determine what other devices are available as shown in decision block 1421. If other devices are not available in decision block 1421, then the notification handling system may make a decision as to whether to automatically respond as shown in decision block 1429. If auto respond is not desirable in decision block 1409, then the method of operation may return to operation block 1423 and check for device capabilities of the current device. However, if auto respond is desirable in decision block 1429, then the notification handling system may take appropriate action as shown in operations block 1431.

The appropriate action for auto responding may be ending a call, muting a call, sending an automatic text reply, sending an automatic e-mail reply, automatically calling back, sending the call to voicemail, performing a global dismissal of the notification or some other action etc. The notification handling system then creates a new notification in operation block 1433 to inform the user that the auto reply was sent in response to the received notification.

The notification handling system may then check for device capabilities in block 1423 and may augment the notification in decision block 1425 based on the device capabilities. Returning to decision block 1421, if other devices are available, the notification handling system may select one or more of the available devices as shown in operation block 1427. For each device, the notification handling system will check the device capabilities as shown in operation block 1423 and will, for each device, determine whether the notification should be augmented as shown in decision block 1425. Depending upon whether the notification should be augmented or not, the method of operation will return to the process flow FIG. 12 in either of operation block 1217, which augments the notification, or operation block 1219, which immediately precedes to route the notification to the selected device or devices. The method of operation then ends in block 1221 as shown.

Therefore, in light of the above description, various use case scenarios may be envisioned by those of ordinary skill. In one example use case scenario, a communication device may receive an incoming notification that an e-mail message has been received. However, based on the user history, the notification handling system may determine that the user rarely if ever responds to e-mail messages from a particular sender and either files the e-mail message or immediately deletes it. The notification handling system may automatically respond by taking the appropriate action, such as deleting the e-mail, and performing a global dismissal of the notification from the receiving device and any other device to which the notification was routed.

In another use case scenario, a user may receive the e-mail message, and the user history may show that the user has a history of responding immediately by sending a responsive e-mail. The notification handling system may determine that the notification should be sent to the user's personal computer which has a keyboard and at which environment analysis shows the user is most likely present and using at the time of the incoming notification. The user may then receive the notification at the personal computer, and type a responsive e-mail and subsequently clear the notification message from all communication devices.

The user may receive a notification of an incoming telephone call at a mobile telephone communication device and the notification handling system may determine that the user is in an important meeting based on calendar data and location information obtained from the user's mobile telephone. Assuming that the behavior analysis indicates the call is not particularly urgent based on its content, the sender, and other information collected as was described above, the notification may not be routed to the user's mobile telephone. Instead, the notification may be routed to the user's smart watch. At that point the user may be able to see the caller's name and press a button, or utilize some other user interface of the smart watch, to perform a global dismissal of the call.

As will be understood by those of ordinary skill in view of the detailed description of various embodiments provided herein, many other various use case scenarios may be realized using the features of the embodiments described above. Therefore the features and functions described above for the notification handling system provide many advantages over prior systems such that the wide variety of use case scenarios may be realized and a more intelligent system for providing notifications to a user can likewise be achieved.

While various embodiments have been illustrated and described, it is to be understood that the invention is not so limited. Numerous modifications, changes, variations, substitutions and equivalents will occur to those skilled in the art without departing from the scope of the present invention as defined by the appended claims.

What is claimed is:

1. A method comprising:
   receiving, by a mobile computing device, a notification;
   determining, by the mobile computing device, a type of the notification;
   determining, based on motion data generated by an accelerometer of the mobile computing device, an activity of a user of the mobile computing device; and
   responsive to determining that the activity of the user of the mobile computing device is running or walking:
      determining, by the mobile computing device, one or more capabilities of a wearable computing device connected to the mobile computing device via a wireless link;
      augmenting, by the mobile computing device and based on the one or more capabilities of the wearable computing device, the notification with additional information, the additional information including a time the notification was received; and
      sending, from the mobile computing device to the wearable computing device via the wireless link, the notification including the additional information.

2. The method of claim 1, further comprising:
   responsive to determining that the activity is traveling in a train, forwarding, by the mobile device the notification to a different computing device from a group of computing devices associated with the user, wherein the mobile computing device and the wearable computing device are included in the group of computing devices.

3. The method of claim 1, wherein the mobile computing device is a first computing device from a group of computing devices associated with the user, the method further comprising:
   receiving, by the first computing device, from a second computing device from the group of computing devices, sensor data from a plurality of sensors of the second computing device;
   determining, by the first computing device, based on the sensor data received from the second computing device, an environment of the second computing device; and
   selectively sending, by the first computing device, to the second computing device, and based on the environment of the second computing device, the notification.

4. The method of claim 3, wherein the sensor data received from the second computing device includes a location of the second computing device, the method further comprising:
   determining, by the first computing device, based on the location of the second computing device, whether the second computing device is in proximity to the first computing device,
   wherein selectively sending the notification comprises, responsive to determining that the second computing device is in the proximity of the first computing device, sending, by the first computing device, to the second computing device, the notification.

5. The method of claim 1, further comprising:
   receiving, by the mobile computing device, from the wearable computing device, a notification dismissal command; and
   sending, by the mobile computing device, a global dismissal command to each computing device from a group of computing devices associated with the user to cause the notification to be dismissed by each computing device from the group of computing devices.

6. The method of claim 1, wherein the notification is a first notification, the method further comprising:
   responsive to determining that the activity is traveling in the airplane or traveling in a vehicle:
      sending, by the mobile computing device, an automatic reply to a sender of the first notification; and
      outputting, by the mobile computing device, a second notification indication that the automatic reply was sent to the sender of the first notification.

7. A mobile computing device comprising:
   at least one wireless transceiver that receives a notification;
   an accelerometer that generates motion data based on movement of the mobile computing device;
   a memory that stores instructions for a notification handling system; and
   one or more processors that executes the instructions for the notification handling system to:
      determine a type of the notification;
      determine, based on the motion data, an activity of a user of the mobile computing device; and
      responsive to determining that the activity of the user of the mobile computing device is running or walking:
         determine one or more capabilities of a wearable computing device connected to the mobile computing device via a wireless link;
         augment, based on the one or more capabilities of the wearable computing device, the notification with additional information, the additional information including a time the notification was received; and
         send, to the wearable computing device via the wireless link, the notification including the additional information.

8. The mobile computing device of claim 7, wherein the processor executes the instructions for the notification handling system to:
   responsive to determining that the activity is traveling in a train, send the notification to a different computing device from a group of computing devices associated with the user, wherein the mobile computing device and the wearable computing device are included in the group of computing devices.

9. The mobile computing device of claim 7, wherein:
the mobile computing device is a first computing device from a group of computing devices associated with the user; and
the processor executes the instructions for the notification handling system to:
receive, from a second computing device from the group of computing devices, sensor data from a plurality of sensors of the second computing device;
determine, based on the sensor data received from the second computing device, an environment of the second computing device; and
selectively send, to the second computing device, and based on the environment of the second computing device, the notification.

10. The mobile computing device of claim 9, wherein:
the sensor data received from the second computing device includes a location of the second computing device; and
the processor executes the instructions for the notification handling system to:
determine, based on the location of the second computing device, whether the second computing device is in proximity to the first computing device,
wherein selectively sending the notification comprises, responsive to determining that the second computing device is in the proximity of the first computing device, send, to the second computing device, the notification.

11. The mobile computing device of claim 7, wherein the processor executes the instructions for the notification handling system to:
receive, from the wearable computing device, a notification dismissal command; and
send a global dismissal command to each computing device from a group of computing devices associated with the user to cause the notification to be dismissed by each computing device from the group of computing devices.

12. The mobile computing device of claim 7, wherein the notification is a first notification, and wherein the processor executes the instructions for the notification handling system to:
responsive to determining that the activity is traveling in the airplane or traveling in a vehicle:
send an automatic reply to a sender of the first notification; and
output a second notification indication that the automatic reply was sent to the sender of the first notification.

13. A computer-readable memory encoded with instructions that, when executed, cause one or more processors of a first computing device to:
receive a notification, wherein the first computing device is from a group of computing devices associated with a user of the first computing device, and wherein a wearable computing device connected to the first computing device via a wireless link is included in the group of computing devices;
determine a type of the notification;
determine, based on motion data generated by an accelerometer of the first computing device, an activity of the user of the first computing device; and
responsive to determining that the activity is running or walking:
determine one or more capabilities of the wearable computing device;
augment, based on the one or more capabilities of the wearable computing device, the notification with additional information, the additional information including one or more of a time the notification was received; and
send, to the wearable computing device via the wireless link, the notification.

14. The computer-readable memory of claim 13, wherein the instructions further cause the one or more processors to:
receive, from the wearable computing device, a notification dismissal command; and
send a global dismissal command to each computing device from the group of computing devices to cause the notification to be dismissed by each computing device from the group of computing devices.

15. The computer-readable memory of claim 13, wherein the notification is a first notification, and wherein the instructions further cause the one or more processors to:
responsive to determining that the activity is traveling in the airplane or traveling in a vehicle:
send an automatic reply to a sender of the first notification; and
output a second notification indication that the automatic reply was sent to the sender of the first notification.

* * * * *